(12) United States Patent
Valency et al.

(10) Patent No.: US 9,063,841 B1
(45) Date of Patent: Jun. 23, 2015

(54) EXTERNAL MEMORY MANAGEMENT IN A NETWORK DEVICE

(75) Inventors: Lior Valency, Tel-Aviv (IL); Gil Levy, Hod Hasharon (IL); Carmi Arad, Nofit (IL)

(73) Assignee: MARVELL ISRAEL (M.L.S.L.) LTD., Yokneam (IL)

( * ) Notice: Subject to any disclaimer, the term of this patent is extended or adjusted under 35 U.S.C. 154(b) by 319 days.

(21) Appl. No.: 13/563,497

(22) Filed: Jul. 31, 2012

Related U.S. Application Data

(60) Provisional application No. 61/513,971, filed on Aug. 1, 2011.

(51) Int. Cl.
*G06F 12/02* (2006.01)
*G06F 13/16* (2006.01)
*G06F 3/06* (2006.01)

(52) U.S. Cl.
CPC .......... *G06F 12/023* (2013.01); *G06F 13/1673* (2013.01); *G06F 3/0656* (2013.01)

(58) Field of Classification Search
None
See application file for complete search history.

(56) References Cited

U.S. PATENT DOCUMENTS

| | | | |
|---|---|---|---|
| 5,590,122 A | 12/1996 | Sandorfi et al. | |
| 6,781,992 B1 | 8/2004 | Rana et al. | |
| 6,795,866 B1 | 9/2004 | Mankude et al. | |
| 6,912,217 B1 | 6/2005 | Vogel | |
| 7,027,443 B2 | 4/2006 | Nichols et al. | |
| 7,320,037 B1 * | 1/2008 | Maturi et al. | 709/236 |
| 7,349,437 B2 | 3/2008 | Horton et al. | |
| 7,486,673 B2 | 2/2009 | Harijono et al. | |
| 7,583,673 B2 | 9/2009 | Liu | |
| 7,685,121 B2 | 3/2010 | Brown et al. | |
| 8,116,306 B2 * | 2/2012 | Shimizu | 370/381 |
| 2003/0081624 A1 | 5/2003 | Aggarwal et al. | |
| 2006/0187834 A1 | 8/2006 | Nichols et al. | |
| 2008/0304485 A1 | 12/2008 | Sinha et al. | |
| 2010/0070695 A1 * | 3/2010 | Baek et al. | 711/104 |
| 2011/0047356 A2 * | 2/2011 | Flynn et al. | 712/220 |

OTHER PUBLICATIONS

Y. Tamir, et al., "High-performance Multi-queue Buffers for VLSI Communication Switches," CSD-880003, University of California Los Angeles Computer Science Dept. (Jan. 1988), 21 pages.

* cited by examiner

*Primary Examiner* — Gary Portka (57) ABSTRACT

In a method for storing packets in a network device, a memory space spanning a plurality of external memory devices is partitioned into a plurality of multi-buffers. Each multi-buffer spans multiple memory devices in the plurality of external memory devices. Each multi-buffer is partitioned into a plurality of buffer chunks and the plurality of buffer chunks are distributed among the multiple memory devices Further, a packet is divided into one or more packet chunks including at least a first packet chunk. The one or more packet chunks are stored in one or more consecutive buffer chunks of at least a first multi-buffer of the plurality of multi-buffers.

28 Claims, 8 Drawing Sheets

EXTERNAL MEMORY MANAGEMENT IN A NETWORK DEVICE

CROSS-REFERENCE TO RELATED APPLICATION

This application claims the benefit of U.S. Provisional Patent Application No. 61/513,971 entitled "External memory management for deep buffering," filed on Aug. 1, 2011, the entire disclosure of which is hereby incorporated by reference herein.

FIELD OF THE DISCLOSURE

The present disclosure relates generally to communication networks and, more particularly, to network devices such as switches, routers, and edge devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Network devices such as network switches, routers, edge devices and the like often employ store and forward architectures in which received packets are stored in memory for subsequent transmission to desired destinations after processing. Such devices sometimes employ external memory for storing the received packets. In such devices, it is very important to efficiently manage memory available to the network device to store packet data in the external memory without significant memory waste, and to thereafter retrieve the data from the memory without introducing any significant latency to the network traffic flowing through the network device.

SUMMARY

In an embodiment, a method for storing packets in a network device includes partitioning a memory space spanning a plurality of external memory devices into a plurality of multi-buffers, wherein each multi-buffer spans multiple memory devices in the plurality of external memory devices. The method also includes partitioning each multi-buffer into a plurality of buffer chunks, wherein the plurality of buffer chunks are distributed among the multiple memory devices and dividing a packet into one or more packet chunks including at least a first packet chunk. The method further includes storing the one or more packet chunks in one or more consecutive buffer chunks of at least a first multi-buffer of the plurality of multi-buffers.

In another embodiment, a network device comprises a plurality of ports and a forwarding engine coupled to the plurality of ports, the forwarding engine configured to transfer packets received via at least some of the plurality of ports to one or more appropriate ports in the plurality of ports. The network device also comprises a plurality of external memory devices to store packets received via the plurality of ports. The network device further comprises a memory controller configured to partition a memory space spanning the plurality of external memory devices into a plurality of multi-buffers, wherein each multi-buffer spans multiple memory devices in the plurality of external memory devices. The memory controller is additionally configured to partition each multi-buffer into a plurality of buffer chunks, wherein the plurality of buffer chunks are distributed among multiple external memory devices and divide a packet into one or more packet chunks including at least a first packet chunk. The memory controller is further configured to store the one or more packet chunks in one or more consecutive buffer chunks of at least a first multi-buffer of the plurality of multi-buffers, wherein the buffer chunks of the first multi-buffer are distributed among multiple memory devices in the plurality of memory devices.

In yet another embodiment, a method for memory load balancing in a network device includes providing a plurality of external memory devices communicatively coupled to the network device and partitioning a memory space spanning the plurality of external memory devices into a plurality of multi-buffers, wherein each multi-buffer spans the plurality external memory devices. The method further includes partitioning each multi-buffer of the plurality of multi-buffers into a number of buffer chunks, the number of buffer chunks determined based on a number of memory devices in the plurality of external memory devices, wherein the buffer chunks of each multi-buffer are distributed equally among the plurality of memory devices. The method further includes storing each of one or more packets received at the network devices in consecutive buffer chunks of at least one multi-buffer of the plurality of multi-buffers, wherein the buffer chunks of the at least one multi-buffer are distributed equally among the plurality of memory devices.

In still another embodiment, a network device comprises a plurality of ports and a forwarding engine coupled to the plurality of ports, the forwarding engine configured to transfer packets received via at least some of the plurality of ports to one or more appropriate ports in the plurality of ports. The network device also comprises a plurality of external memory devices to store packets received via the plurality of ports. The memory device further comprises a memory controller configured to partition a memory space spanning the plurality of external memory devices into a plurality of multi-buffers, wherein each multi-buffer spans the plurality external memory devices. The memory controller is further configured to partition each multi-buffer of the plurality of multi-buffers into a number of buffer chunks, the number determined based on a number of memory devices in the plurality of external memory devices, wherein the buffer chunks of each multi-buffer are distributed equally among the plurality of memory devices. The memory controller is further configured to store each of one or more packets in consecutive buffer chunks of at least one multi-buffer of the plurality of multi-buffers.

DETAILED DESCRIPTION

Example methods and apparatus are described herein in the context of Ethernet networks. One of ordinary skill in the art will recognize, in light of the disclosure and teachings herein, that similar methods and apparatus are suitable for use in other communication networks as well.

Figure 1:
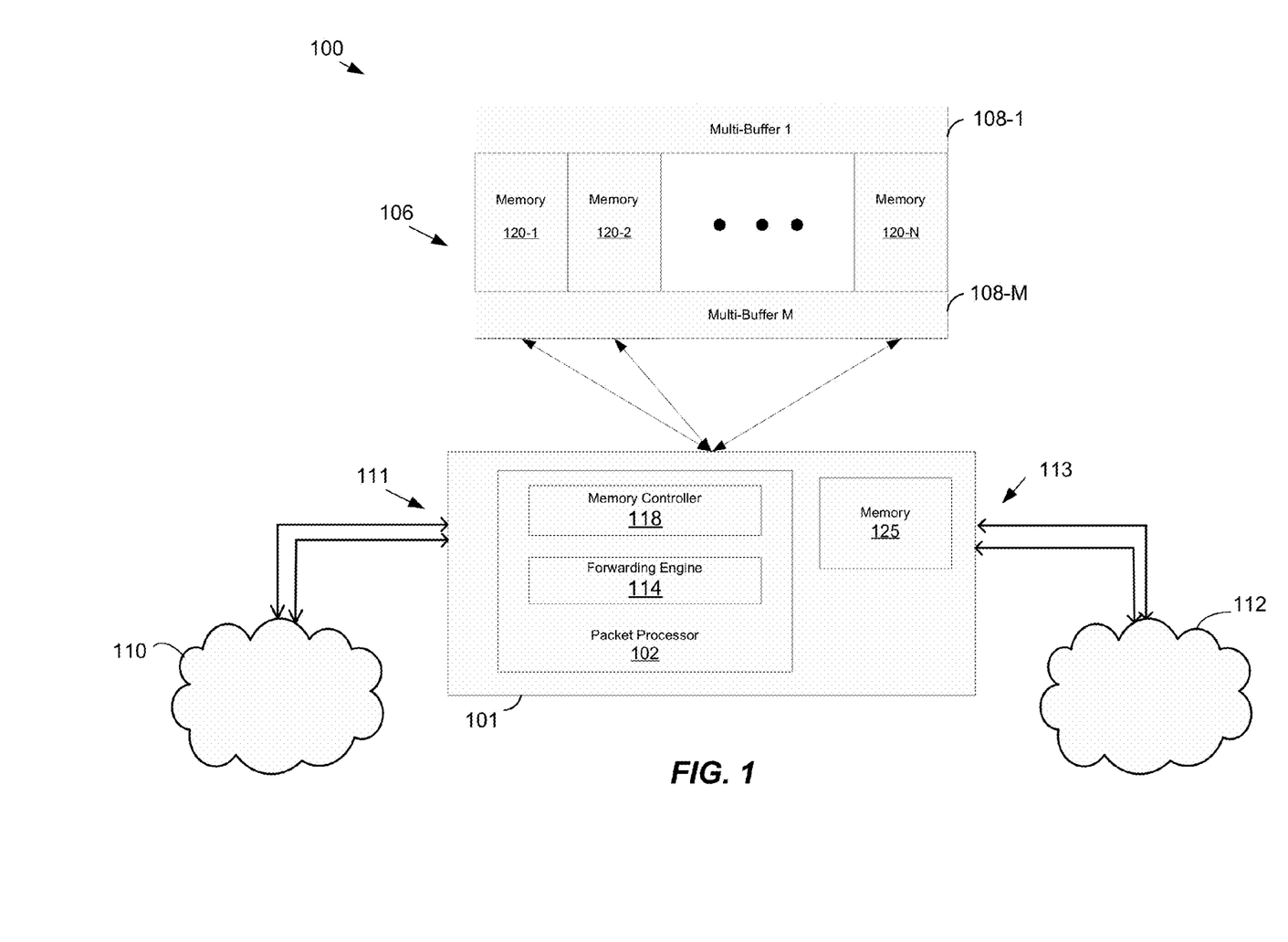
FIG. 1 is a block diagram illustrating a communication system in which a network device is configured to efficiently store packets in a memory space spanning a plurality of external memory devices communicatively coupled to the network device, in accordance with an embodiment of the present disclosure.

FIG. 1 is a block diagram of a communication system 100 in which a network device 101 is configured to efficiently store packets received by the network device 101 in a memory space 106 spanning a plurality of external memory devices 120 communicatively coupled to the network device 101, in accordance with an embodiment of the present disclosure. In an embodiment, the memory space 106 is partitioned into a number of multi-buffers, wherein each multi-buffer is spread over at least two of the memory devices 120. In this embodiment, for the purpose of writing packets to the memory space 106, each multi-buffer is considered as a continuous memory space within the memory space 106, although different chunks or portions of the multi-buffer are actually stored in different ones of the external memory devices 120. As will be described in more detail below, when a packet is received by the network device 106, the packet is partitioned into one or more packet chunks, and the one or more packet chunks are stored in consecutive buffer chunks of one or more multi-buffers. Because the multi-buffers are spread over multiple memory devices 120, in this embodiment, packet chunks of a packet written to consecutive buffer chunks of one or more multi-buffers are stored in multiple memory devices 120, in some embodiments and/or scenarios.

The network device 101 is suitably a network switch, router, edge device or any other suitable network device that is configured to receive, store, and forward packets. The network device 101 in the example communication system 100 is disposed between an external network 110 and an internal network 112, although generally the network device 101 can operate in any suitable configuration (e.g., in a wide area network (WAN), a local area network (LAN), as an interface between a WAN and a LAN, as an interface between two segments of a LAN, etc.). Additionally or alternatively, the network device 101 functions as a router between two or more wide area networks or local area networks. The memory devices 120 are coupled to the network device 101 via a double data rate (DDR) interface, such as, for example, the DDR type 2 (DDR2) or the DDR type 3 (DDR3) interface, according to an embodiment. In other embodiments, the memory devices 120 are coupled to the network device 101 via other suitable interfaces.

The network device 101 generally includes a network interface with one or several network ports to communicate with the networks 110 and 112 via respective links 111 and 113. The network device 101 further includes a packet processor 102, which includes a forwarding engine 114 and a memory controller 118. In operation, the forwarding engine 114 processes packets received by the network device 101 via one or more of the network ports and transfers the received packets to one or more appropriate other network ports of the network device 101 for transmission to one or more desired destinations. In an embodiment, the memory controller 118 stores received packets in the memory space 106. As explained in more detail below, in various embodiments, the memory controller 118 is configured to efficiently manage the memory space 106 spanning the external memory devices 120 for storing variable length packets (e.g., variable length Ethernet packets) received by the network device 101 in the memory space 106 by partitioning the memory space 106 into a plurality of multi-buffers 108, and by further portioning each multi-buffer 108 into a plurality of buffer chunks.

In an embodiment, a packet received by the memory controller 118 to be stored in the memory space 106 is divided into one or more packet chunks and is stored in the memory space 106 in one or more consecutive buffer chunks of one or more of the multi-buffers 108. Storing a received packet in buffer chunks allows the memory controller 118 to efficiently utilize the memory space 106 by allocating buffer space large enough to store a packet chunk (rather than an entire packet). Further, because packet chunks are consecutively stored in the memory space 106, in an embodiment, the memory controller 118 is able to quickly retrieve a packet from the memory space 106 because a location of each individual packet chunk of the packet need not be separately determined (or retrieved from memory, such as from a linked list) by the memory controller 118. In other words, because packet chunks are consecutively stored in the memory space 106, only a location of the first packet chunk and the number of consecutive buffer chunks used for storing the packet need to be known or determined by the memory controller 118 in order to retrieve the packet from the memory space 106. Further still, as will be described in more detail below, by distributing the multi-buffer chunks among multiple memory devices 120, the memory controller 118 is able to load-balance among the multiple external memory devices, further increasing the bandwidth efficiency in the network device 101, according to at least some embodiments.

The number of the external memory devices 120 coupled to the network device 101, in an embodiment, depends on specific system requirements for the network device 101. In an embodiment, the number of external memory devices 120 is determined based on the system bandwidth requirements. In an embodiment, a memory bandwidth associated with the memory devices 120 is then determined according to:

$$\text{memory bandwidth} = 2 * \text{link bandwidth}/N \qquad \text{Equation 1}$$

where N is the number of external memory devices 120.

Figure 2:
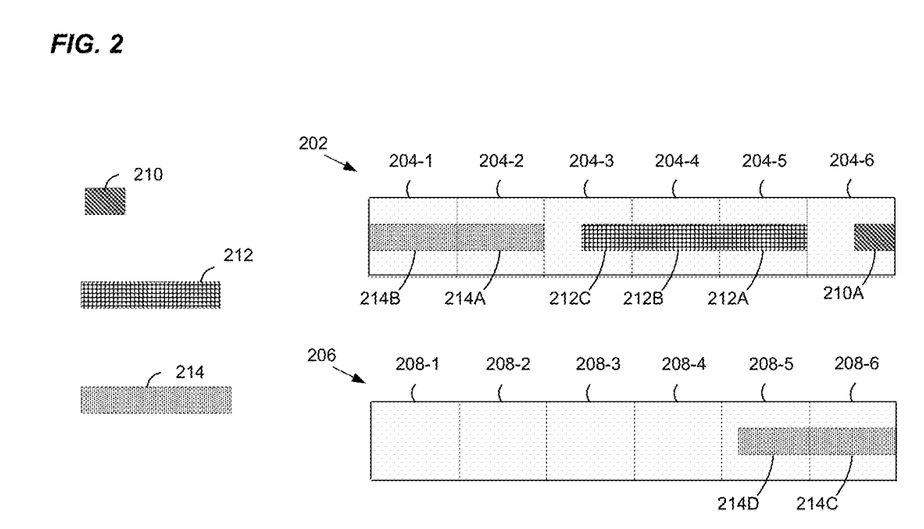
FIG. 2 is a diagram illustrating two example multi-buffers used for storing variable length packets, according to an embodiment.

FIG. 2 is a diagram of an example multi-buffer 202 and an example multi-buffer 206 used for storing packets 210, 212 and 214 received by the network device 101 (FIG. 1), according to an embodiment. In an embodiment, the memory space 106 of FIG. 1 includes the multi-buffers 202 and 206. In an embodiment, the packets 210, 212 and 214 are variable length packets, such as Ethernet packets, for example, that the network device 101 receives from the network 110 or from the network 112, for example. Because the received packets 210-214 are variable length packets, the size of each packet is not known in advance. To allow the memory controller 118 to efficiently utilize the buffer space of the multi-buffers 202 and 206, in an embodiment, each of the multi-buffers 202 and 206 is partitioned into a number of buffer chunks. Depending on the size of the packet being stored, in an embodiment, the packet is stored in one or several buffer chunks of at least one multi-buffer of the multi-buffers 202 and 206. In an embodiment, a packet that occupies more than one buffer chunk is stored in consecutive multiple buffer chunks of a multi-buffer, where the last buffer chunk used for storing the packet is not filled up completely in some situations (e.g., if a packet length is such that the packet does not occupy the entire memory space spanned by the multiple buffer chunks used for storing the packet). A subsequent packet is stored in one or more buffer chunks of the same multi-buffer, beginning with the next buffer chunk following the last buffer chunk used for storing the first packet, according to an embodiment. As a result, in such embodiments and/or scenarios, only a portion of a buffer chunk (i.e., the unfilled portion of the last buffer chunk used for storing a packet) remains unused, resulting in generally high memory utilization.

In the embodiment of FIG. 2, each of the multi-buffers 202 and 206 is partitioned into six buffer chunks for ease of explanation. However, the number of buffer chunks in a multi-buffer varies depending on the embodiment, and in some embodiments, each of the multi-buffers 202 and 206 includes a number of buffer chunks that is significantly larger than six. As an example, in an embodiment, each multi-buffer 202 and 206 spans 32 kilo-bytes of memory space, and each of the buffer chunks 204 and 208 spans 128 bytes of the memory space. Accordingly, in this embodiment, each of the multi-buffers 202 and 206 is partitioned into 250 chunks. As another example, in another embodiment, each multi-buffer 202 and 206 spans 64 kilo-bytes of memory space, and each of the buffer chunks 204 and 208 spans 128 bytes of the memory space. Accordingly, in this embodiment, each of the multi-buffers 202 and 206 is partitioned into 500 chunks. In other embodiments, the multi-buffers 202 and 206 are of any other suitable sizes, and are partitioned into any other suitable number of chunks. In some embodiments, to provide balanced loading of the memory devices spanned by the multi-buffers, the number of buffer chunks in the multi-buffers 202 and 206 is determined based on the number of memory devices spanned by the multi-buffers 202 and 206, as described in more detail below in connection with FIGS. 4 and 5. Further, in some embodiments, the sizes and/or the number of chunks of the multi-buffers 202 and 206 need not be the same.

In an embodiment, each of the packets 210, 212 and 214 is stored in one or more consecutive chunks of at least one of the multi-buffers 202 and 206. As illustrated, the packet 210 is a single-chunk packet, stored in the buffer chunk 204-6 of the multi-buffer 202 (packet chunk 210A). The packet 212 is a larger packet partitioned into three packet chunks 212A, 212B and 212C, which are stored, respectively, in buffer chunks 204-5, 204-4, 204-3. To further improve memory utilization, in some embodiments and/or scenarios, packet chunks of at least some packets are stored in more than one multi-buffer. For example, packet chunks that do not fit in a first multi-buffer being used for storing the packet are stored in a second multi-buffer, according to one such embodiment. In the example embodiment of FIG. 2, the packet 214 is partitioned into four packet chunks 214A, 214B, 214c and 214D, and the packet chunks 214A and 214B are stored in the last two buffer chunks of the multi-buffer 202 (buffer chunks 204-2 and 204-1, respectively), while the packet chunks 214C and 214D are stored in the first two chunks of the multi-buffer 206.

Referring to FIG. 1, in various embodiments and/or scenarios, the memory controller 118 of the network device 101 stores packets in external memory devices 120 using multi-buffers, such as the multi-buffers 202 and 206 by implementing packet storing techniques described herein. For ease of explanation, packet storing techniques are described below in connection to the network device 101 of FIG. 1, although the same or similar packet storing techniques are used by other network devices in other embodiments. In an embodiment, prior to storing packets in a multi-buffer, the memory controller 118 of the network device 101 allocates the multi-buffer from a pool of free multi-buffers and declares the multi-buffer "writable," indicating that the multi-buffer can now be used for storing received packets in the memory space 106. In an embodiment, the pool of free multi-buffers is stored in a local memory 125 of the network device 101. Alternatively, in another embodiment, the pool of free multi-buffers is stored in one or more of the external memory devices 120. In an embodiment, once a multi-buffer has been allocated and declared writable, the memory controller 118 begins writing received packets to multi-buffer chunks of the multi-buffer. At appropriate later times, the memory controller 118 retrieves packets stored in the multi-buffers by reading the stored data from the corresponding multi-buffers. In some embodiments and/or situations, each multi-buffer is used for storing multiple packets, and once all of the packets stored in a multi-buffer are read from the multi-buffer, the multi-buffer is released and returned to the pool of free multi-buffers. In an embodiment, released multi-buffers can then be allocated by the memory controller 118 for storing subsequently received packets.

In some embodiments, the memory controller 118 allocates different multi-buffers for storing packets associated with different target queues. In some embodiments and/or scenarios, packets belonging to different target queues are transmitted by the network device 101 at different transmission rates. Further, in some embodiments and/or scenarios, packets associated with different target queues are delayed in the network device 101 for different periods of time. For example, network ports associated with some target queues are more congested compared to network ports associated with some other target queues in some situations, and packets transmitted using the more congested ports are stored in the memory space 106 for longer periods of time compared to packets transmitted via less congested network ports. Further, in some embodiments, some target queues have higher transmission priority compared to priority associated with other target queues. Because a multi-buffer is not released until all packets stored in the multi-buffer are retrieved from the multi-buffer for transmission via the appropriate network ports associated with the target queues, allocating separate multi-buffers for different target queues results in better memory utilization, in some embodiments. Accordingly, in an embodiment, upon receiving a packet, the packet processor 102 processes the packet to determine the target or the destination of the packet, and associates the packet with a particular target queue. Then, the memory controller 118 stores the packet in the memory space 106 by writing the packet to a multi-buffer allocated for the target queue associated with the packet.

Figure 3:
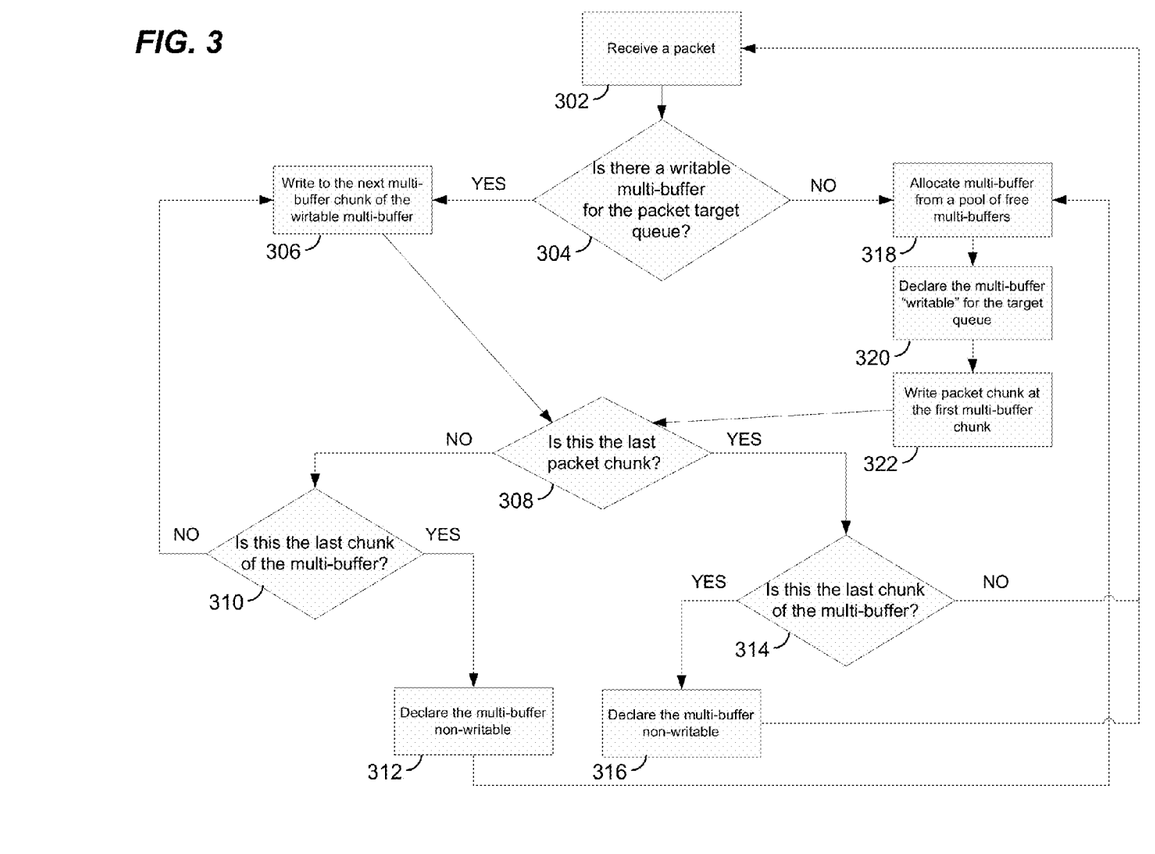
FIG. 3 is a flow chart of a technique used for storing packets in a memory space, according to an embodiment.

FIG. 3 is a flow chart of a technique 300 used for storing packets in a memory space, according to an embodiment. For ease of explanation, the technique 300 is explained in connection with the memory controller 118 of the network device 101 of FIG. 1. However, in other embodiments, the technique 300 is implemented by other device components and/or by other network devices. At block 302, a packet to be stored in external memory is received. The received packet is associated with a target queue. For example, in an embodiment, the packet processor 102 processes the packet to determine an appropriate target queue for the packet and associates the packet with the target queue prior to passing the packet to the memory controller 118.

According to an embodiment, the memory controller 118 stores chunks of the packet received at block 302 in consecutive chunks of a multi-buffer allocated for the target queue. To this end, in an embodiment, the memory controller 118 partitions the packet into one or more packet chunks, where the particular number of packet chunks is determined based on the size of the packet and the size of each buffer chunk in the multi-buffer (or the multi-buffers) in which the packet is to be stored. In an embodiment, the received packet is partitioned into n packet chunks, where n is determined according to $$n = \lceil \text{packet size/buffer chunk size} \rceil \quad \text{Equation 2}$$

where $\lceil \ \rceil$ denotes the ceiling function.

In an embodiment, the one or more packet chunks of a packet are written to one or more buffer chunks of a multi-buffer allocated for the target queue associated with the packet. To this end, in an embodiment, the memory controller 118 allocates a multi-buffer for a target queue, and declares the allocated multi-buffer writable, indicating that packets associated with the target queue can now be written to the multi-buffer, according to an embodiment. Packets associated with the target queue are then written to consecutive buffer chunks of the allocated multi-buffer until the last buffer chunk of the multi-buffer is reached. After writing to the last chunk of the multi-buffer, the memory controller 118 declares the multi-buffer non-writable, indicating that the multi-buffer is now unavailable for writing.

At block 304, the memory controller 118 determines whether a writable multi-buffer for the target queue associated with the packet exists. If it is determined at block 304 that a writable multi-buffer for the target queue exists, then the received packet (or a chunk of the received packet in case the packet is a multi-chunk packet) is written to the next available chunk of the multi-buffer at block 306. On the other hand, if it is determined at block 304 that a writable multi-buffer for the target queue associated with the packet does not exist, then the memory controller 118 allocates a multi-buffer for the target queue at block 318 and then, at block 320, declares the multi-buffer allocated at block 318 writable. Then, at block 322, the received packet (or a chunk of the received packet in case the packet is a multi-chunk packet) is written to the first buffer chunk of the multi-buffer declared writable at block 320.

At block 308, it is determined if the packet chunk written at block 306 (or at block 322) is the last chunk of the packet received at block 302. If it is determined that the packet chunk written at block 306 (or at block 322) is the last chunk of the packet, then the technique 300 proceeds to block 314, at which it is determined whether the buffer chunk to which the packet chunk was written at block 306 (or at block 322) is the last buffer chunk of the multi-buffer. In the case that the buffer chunk is the last chunk of the multi-buffer, the memory controller 118 declares the multi-buffer non-writable, indicating that the multi-buffer is now unavailable for writing. On the other hand, if it is determined at block 314 that the buffer chunk to which the packet chunk was written at block 306 is not the last chunk of the multi-buffer, then the multi-buffer remains writable, i.e., available for writing, and the technique 300 returns to block 302 at which a next packet to be stored in the memory space 106 is received by the memory controller 118.

Referring back to block 308, if it is determined that the packet chunk written at block 306 (or at block 320) is not the last chunk of the packet received at block 302, then the technique 300 proceeds to block 310, at which it is determined whether the buffer chunk to which the packet chunk was written at block 306 (or at block 322) is the last buffer chunk of the multi-buffer. If it is determined at block 310 that the buffer chunk is not the last chunk of the multi-buffer, indicating that the multi-buffer is not yet filled, then the technique 300 returns to block 306, and a next packet chunk is written to the next available chunk of the multi-buffer (i.e., the buffer chunk that immediately flows the buffer chunk to which the packet chunks was written at block 306). Blocks 306, 308 and 310 are repeated until either the end of the multi-buffer or the end of the packet is reached, according to an embodiment.

If the end of the multi-buffer is reached before the end of the packet, then the technique 300 continues at block 312 at which the multi-buffer is declared non-writable, indicating that the multi-buffer is currently unavailable for storing additional packets (or packet chunks). Then, blocks 318 and 320 are performed to allocate a new multi-buffer for the target queue associated with the packet being stored and declares the new multi-buffer writable. Then, at block 322, the next chunk of the packet is written to the first chunk of the newly allocated multi-buffer. The technique 300 then returns to block 308.

In some embodiments, multi-buffer chunks are also used as granularity units for load balancing among the multiple external memory devices 120. To this end, in such embodiments, buffer chunks of each multi-buffer in the memory space 106 are distributed among multiple memory devices 120 (FIG. 1). As a result, in such embodiments, packet chunks stored in a multi-buffer are stored in multiple memory devices 120.

Figure 4:
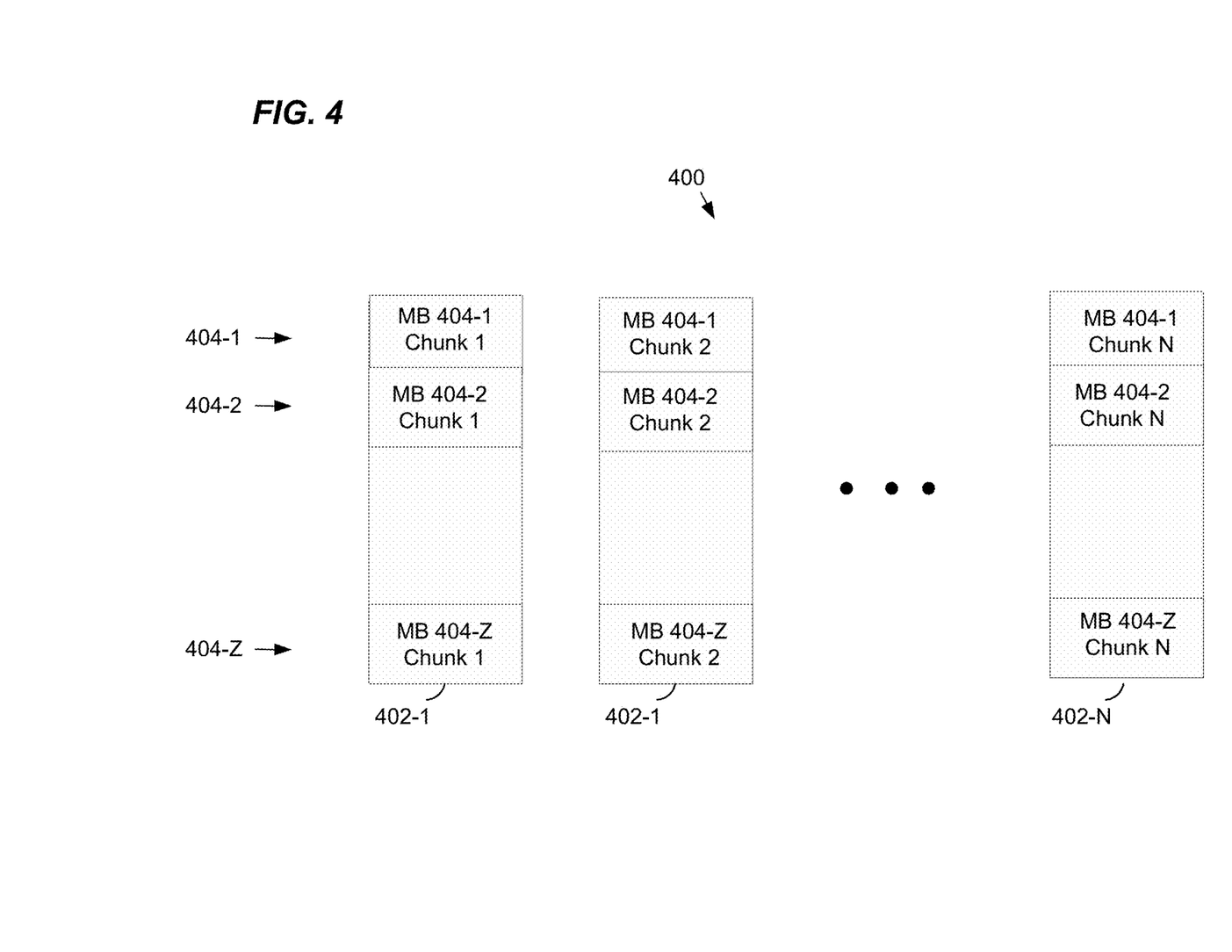
FIG. 4 is a diagram illustrating multi-buffer distribution among a plurality of memory devices, according to an embodiment.

FIG. 4 is a diagram illustrating multi-buffer distribution in a memory space 400 spanning a plurality of memory devices 402, according to one such embodiment. The memory space 400 is partitioned into Z multi-buffers 404, and each of the multi-buffers 404 is partitioned into N buffer chunks (numbered 1 through N) corresponding to the number of memory devices 402 spanned by the memory space 400. Each of the multi-buffer chunks of each multi-buffer 404 is located in a different one of the memory devices 402. Accordingly, in this embodiment, each of the memory devices 402 contains one buffer chunk of each multi-buffer 404. As a result, each of the memory devices 402 contains an equal number of buffer chunks in relation to each of the other memory devices 402, in this embodiment.

In other embodiments in which buffer chunks are equally distributed among multiple memory devices 402, each multi-buffer 404 is partitioned into a number of buffer chunks that is an integer multiple of the number of memory devices 402. That is, in such embodiments the number of buffer chunks in each multi-buffer is determined according to:

$$\text{Number of multi-buffer chunks} = M \times \text{number of memory devices} \quad \text{Equation 3}$$

where M is an integer.

In the embodiment of FIG. 4, each multi-buffer 404 is partitioned into a number of buffer chunks determined according to Equation 3 with M equal to one. In other embodiments, each multi-buffer 404 is partitioned into a number of buffer chunks determined according to Equation 3 with M equal to a suitable integer greater than one. In any case, the buffer chunks are equally distributed among the memory devices 402 in some embodiments, resulting in a balanced loading among the memory devices 402. It should be noted that in embodiments in which multi-buffers are allocated per target queue, load balancing using the described techniques is also achieved per target queue. That is, in such embodiments, memory loading among the multiple memory devices 402 is balanced separately for each of the target queues.

In some embodiments, load balancing among multiple memory devices is achieved by distributing the first buffer chunks of different multi-buffers of the multi-buffers 108 in different memory devices 120. That is, in such embodiments, mapping of buffer chunks of a multi-buffer to multiple memory devices 120 (FIG. 1) is performed dynamically, for example, upon allocation of the multi-buffer for storing packets (e.g., for a particular target queue). As an example, in one embodiment, the memory controller 118 assigns a first memory device 120 for storing a first multi-buffer chunks of a multi-buffer (e.g., upon allocating a multi-buffer), and incrementally assigns each consecutive memory device 120 for storing each incrementally consecutive buffer chunk of the multi-buffer. As another example, in another embodiment, the memory controller 118 maps buffer chunks of a multi-buffer to external memory devices 120 by randomly assigning the memory devices 120 for storing different buffer chunks of the multi-buffer. As yet another example, in yet another embodiment, the memory controller 118 maps buffer chunks of a multi-buffer to external memory devices 120 by determining a memory device for storing the first buffer chunk of a first multi-buffer. Accordingly, in embodiments in which multi-buffer allocation is performed per target queue, load balancing is also achieved per target queue.

Figure 5:
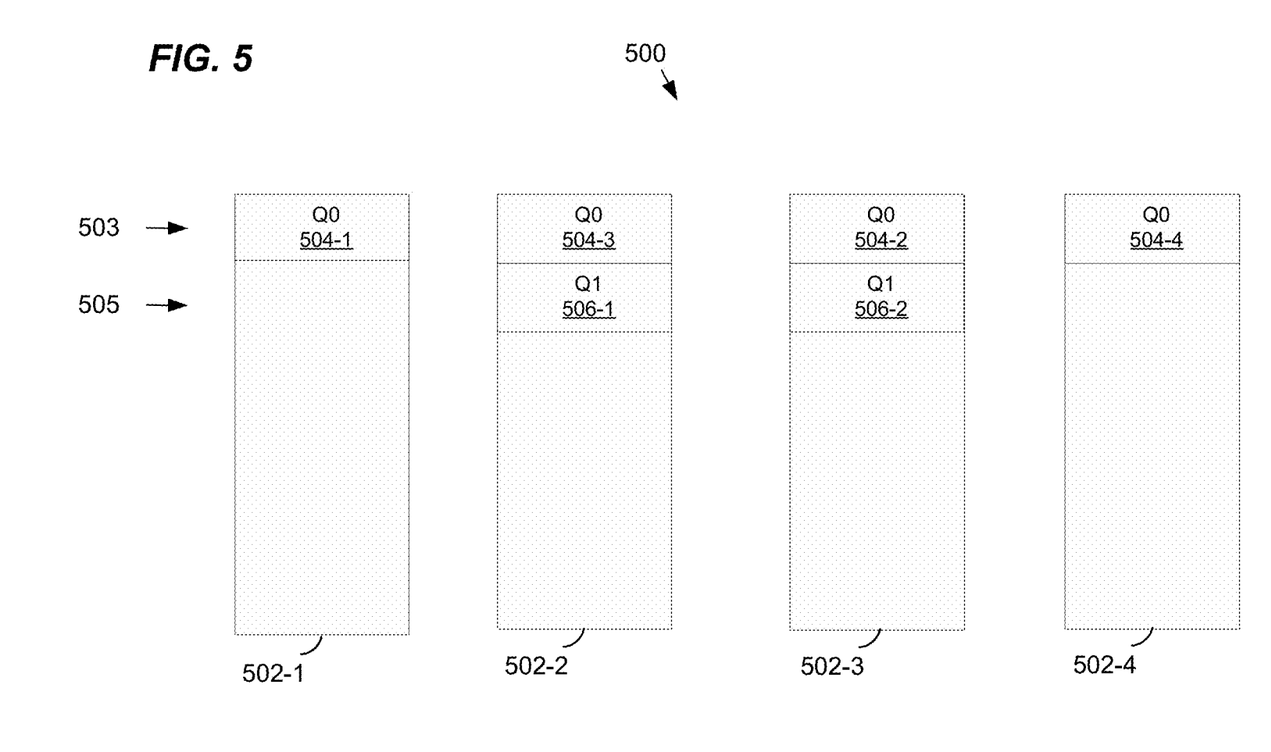
FIG. 5 is a diagram illustrating multi-buffer distribution among a plurality of memory devices, according to an embodiment.

FIG. 5 is a diagram illustrating buffer distribution in a memory space 500 spanning four memory devices 502, according to an embodiment. In the illustrated embodiment, a multi-buffer 503 first is allocated for a target queue Q0, and a second multi-buffer 505 is allocated for a target queue Q1. In an embodiment, the first buffer chunk 504-1 of the multi-buffer 503 is located in a different memory device 502 than the first buffer chunk 506-1 of the second multi-buffer 505. In the example embodiment illustrated in FIG. 5, the first buffer chunk 504-1 of the first multi-buffer 503 is located in a memory device 502-1, while the first buffer chunk 506-1 of the second multi-buffer 505 is located in the memory device 502-2. Distributing first buffer chunks of different multi-buffers to different ones of the memory devices provides better load balancing among the memory devices in at least some embodiments and/or scenarios.

Figure 6:
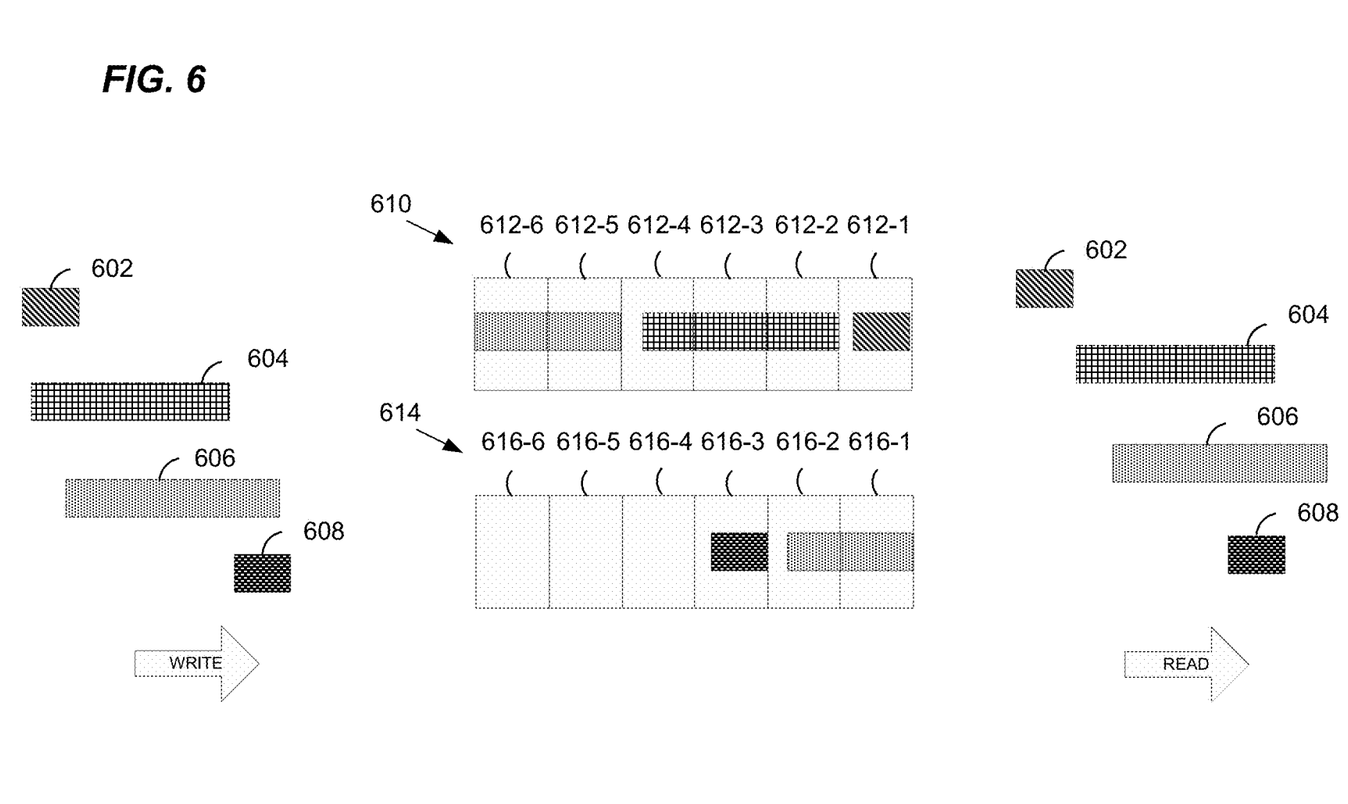
FIG. 6 is a block diagram illustrating several packets as the packets are written to multi-buffers and subsequently read from the multi-buffers using packet storing techniques of the present disclosure, according to an embodiment.

FIG. 6 is a block diagram illustrating several variable length packets 602-608 as the packets are written to multi-buffers 610 and 614 and subsequently read from the multi-buffers 610 and 614 using packet storing techniques of the present disclosure, according to an embodiment. A packet processor, such as the packet processor 102 of FIG. 1 receives the packets 602-608 at one or more ingress ports 111, and passes the packets to be stored in the memory devices 120 to the memory controller 118. In an embodiment, the memory controller 118 writes the packets to multi-buffer chunks of a multi-buffer 610 and/or a multi-buffer 614 in accordance, for example, with the technique 300 explained above in connection to FIG. 3. Then, the memory controller 118 reads each of the packets 602-608 from the multi-buffers 610 and/or 614 in which the packets 602-608 are stored for transmission via one or more of the ports 111 of the network device 101.

In an embodiment, each of the packets 602-608 belongs to a target queue Q0. Initially, there is no writable multi-buffer for the target queue Q0. In an embodiment, the memory controller 118 receives the packet 602, associated with target queue Q0, determines that there is no multi-buffer allocated for Q0, allocates the multi-buffer 610 (from a pool of free multi-buffers for the target queue Q0, and declared the multi-buffer 610 writable for the target queue Q0. The memory controller 118 then writes the packet 602 to the first buffer chunk 612-1 of the multi-buffer 610. As illustrated, the packet 602 is a single-chunk packet written to a single buffer chunk of the multi-buffer 610. The memory controller 118 then receives a three-buffer chunk packet 604. Upon determining that the packet 604 belongs to the target queue Q0, the memory controller 118 writes the packet 604 to the next three chunks of the multi-buffer 610, starting with the next available buffer chunk in the multi-buffer 610 (buffer chunks 612-2, 612-3 and 612-4). As illustrated, the buffer chunk 612-2 (or the "next available" buffer chunk) is the first unused, or fully available, buffer chunk following the buffer chunk 612-1 used for storing the packet 602, according to an embodiment, In an embodiment, each of the buffer chunks 612-2, 612-3, ah 612-4 corresponds to a memory space in a different one of the memory devices 120. Accordingly, in this embodiment, the packet 604 is spread among multiple memory devices 120.

The memory controller 118 then receives a four-buffer chunk packet 606, determines that the packet 606 belongs to the target queue Q0, and writes the first two chunks of the packet 606 to the last two chunks of the multi-buffer 610 (buffer chunks 612-5 and 612-6). At this point, the multi-buffer 610 is filled up, and, accordingly, the memory controller 118 declares the multi-buffer 610 non-writable, indicating that the multi-buffer 610 is now unavailable for writing. To store the remaining chunks of the packet 606, the memory controller 118 allocates a multi-buffer 614, and declares the multi-buffer 614 writable, indicating that the multi-buffer 614 is available for writing. The last two chunks of the packet 606 are then written to the first two buffer chunks 616-1 and 616-2 of the multi-buffer 614.

Because each of the multi-buffers 610 and 614 holds packets belonging to the same target queue Q0, the packets stored in the multi-buffers 610 and 614 are read from the multi-buffers 610 and 614 in which the packets are stored in the same order that the packets had been written to the multi-buffers 610 and 614. Thus in order to transmit the packets 602-606, for example when the port (or ports) associated with the target queue Q0 become available for transmitting the packets 602-606, the memory controller 118 first reads the packet 602 from the buffer chunks 612-1, then reads the packet 604 from the buffer chunks 612-2, 612-3 and 612-4, and then reads then packet 606 from the buffer chunks 612-5, 612-6, 616-1 and 616-2. To read a packet from one or more multi-buffers in which the packet is stored, the memory controller 118 utilizes a packet descriptor associated with the packet, according to an embodiment. In an embodiment, the packet descriptor includes a pointer to or another indication of the multi-buffer (or multi-buffers) in which the packet is stored, an indication of the buffer chunk at which the first packet chunk of the packet is written, and the number of buffer chunks used for storing the packet. Because the packet is stored consecutively in the multi-buffer (or multi-buffers), this information is sufficient to retrieve the packet, and the memory controller 118 is able to quickly retrieve the packet from the memory devices in which the packet is stored because the memory controller 118 need not individually determine a memory location of each packet chunk of the packet, according to an embodiment.

In an embodiment, the memory controller 118 (FIG. 1) releases a multi-buffer and returns the multi-buffer to the pool of free multi-buffers when all of the packets stored in the multi-buffer are retrieved. Accordingly, upon reading the portion of the packet 606 stored in the last two chunks 612-5 and 612-6 of the multi-buffer 610, the memory controller 118 releases the multi-buffer 610 and returns the multi-buffer 610 to the pool of free multi-buffers, according to an embodiment. On the other hand, the multi-buffer 614, though empty after the packet chunks of the packet 606 are retrieved from the buffer chunks 616-1 and 616-2, is still a writable multi-buffer for storing packets belonging to the target queue Q0, according to an embodiment. Accordingly, in an embodiment, when the memory controller receives the packet 608, after having retrieved packet chunks of the packet 606 stored in the first two buffer chunks of the multi-buffer 614, and determines that the packet 608 belongs to the target queue Q0, the memory controller 118 writes the packet 608 to the next available buffer chunk of the multi-buffer 614, i.e., the buffer chunk 616-3 of the multi-buffer 614 that immediately follows the last buffer chunk of the multi-buffer 614 to which a packet chunks has been previously written by the memory controller 118. Because the end of the multi-buffer 614 is not yet reached, the multi-buffer 614 is still a writable multi-buffer for the target queue Q0 and is, therefore, available for storing additional packets belonging to the target queue Q0 subsequently received by the memory controller 118, according to an embodiment.

Figure 7:
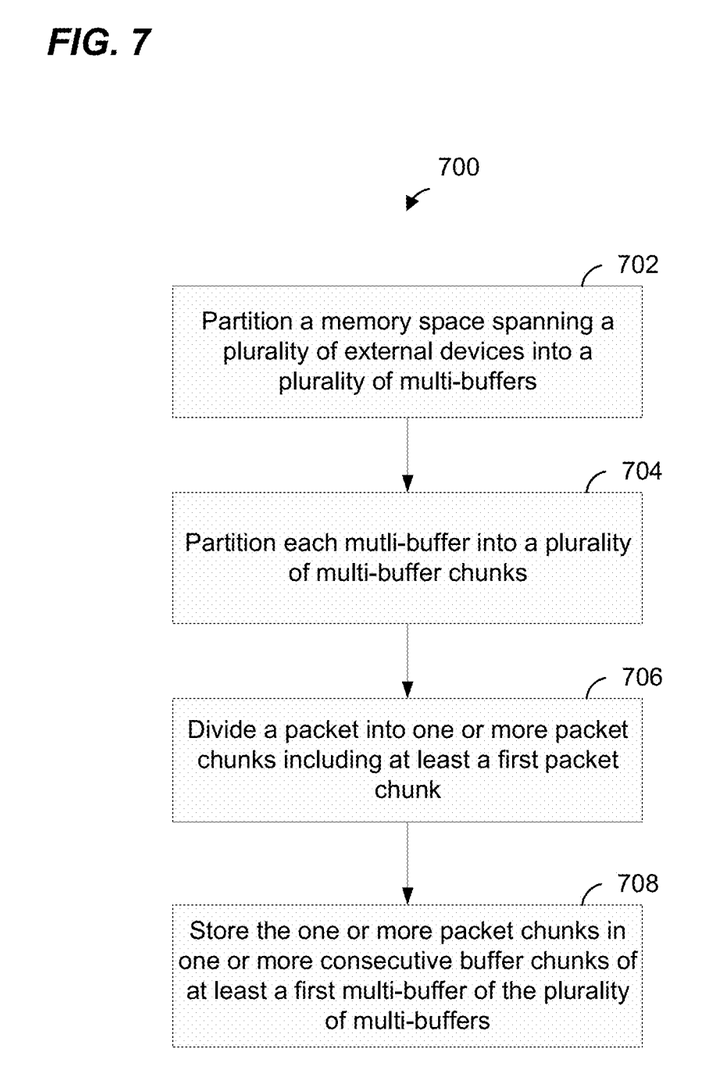
FIG. 7 is a flow diagram of an example method for storing packets in external memory devices, according to an embodiment.

FIG. 7 is a flow diagram of an example method 700 for storing packets in external memory devices, according to an embodiment. In an embodiment, the method 700 is implemented by the network device 101 of FIG. 1. The method 700 is performed at least partially by the memory controller 118, in one embodiment. In other embodiments, the method 700 is performed by other suitable components of the network device 101 or by another suitable network device communicatively coupled to a plurality of external memory devices.

At block 702, a memory space spanning the plurality of external memory devices is partitioned into a plurality of multi-buffers. In an embodiment, the memory space 106 spanning the external memory device 120 is partitioned into a plurality of multi-buffers at block 702. In an embodiment, each multi-buffer of the plurality of multi-buffers spans two or more memory devices 120. For example, in an embodiment, a first multi-buffer spans memory devices 120-1 and 120-2. A second multi-buffer spans the memory devices 120-2, 120-3 and 120-4, for example. In one embodiment, each multi-buffer of the plurality of multi-buffers spans all external memory devices in the plurality of external memory devices, as illustrated in FIG. 4.

At block 704, each multi-buffer of the plurality of multi-buffers is partitioned into a plurality of buffer chunks. In some embodiments, the number of buffer chunks in the plurality of buffer chunks is determined based on the number of external memory devices in the plurality of memory devices, or on the number of external memory devices spanned by each multi-buffer. For example, in some such embodiments, the number of buffer chunks equals the number of external memory devices, or equals the number of memory devices spanned by the multi-buffer being partitioned. In another embodiment, the number of buffer chunks is a multiple integer of the number of memory devices in the plurality of memory devices. In an embodiment, the number of buffer chunks is determined according to Equation 3. In some embodiments, the buffer chunks are distributed equally among the plurality of memory devices.

At block 706, a packet received by the network device is partitioned into one or more packet chunks. In an embodiment, the packet is partitioned into a number of packet chunks determined based on a packet size and a buffer chunk size, for example in accordance with Equation 2. At block 708 the one or more packet chunks are stored in one or more consecutive buffer chunks of at least a first multi-buffer of the plurality of multi-buffers. In an embodiment, one of the packets 602-608 is stored at block 708 in one or more buffer chunks of at least one of the multi-buffers 610 and 612 as explained in more detail above in connection with FIG. 6. In an embodiment, the packet is stored at block 708 in accordance with the technique 300 of FIG. 3.

Figure 8:
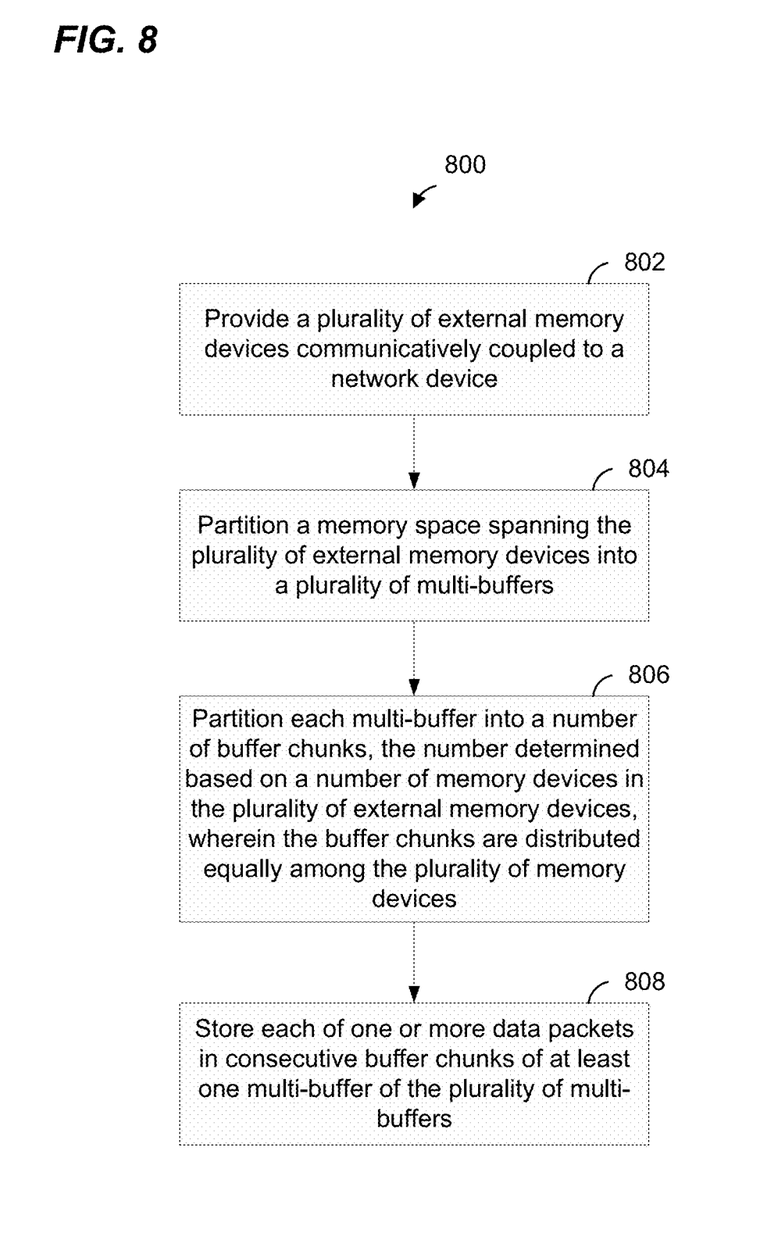
FIG. 8 is a flow diagram of an example method for memory load balancing in a network device, according to an embodiment.

FIG. 8 is a flow diagram of an example method 800 for memory load balancing in a network device, according to an embodiment. In an embodiment, the method 800 is implemented by the network device 101 of FIG. 1. The method 800 is implemented at least partially by the memory controller 118, in one embodiment. In other embodiments, the method 800 is implemented by other suitable components of the network device 101 or by another suitable network device communicatively coupled to a plurality of external memory devices.

At block 802, a plurality of external memory devices coupled to a network device are provided. In an embodiment, the memory devices 120 coupled to the network device 101 (FIG. 1) are provided. In other embodiments, other suitable memory devices and/or memory devices coupled to another suitable network device are provided. At block 804, a memory space spanning the plurality of external memory devices provided at block 802 is partitioned into a plurality of multi-buffers. In an embodiment, the memory space 106 spanning the external memory device 120 is partitioned into a plurality of multi-buffers at block 804. In some embodiments, each of the multi-buffers spans two or more of the external memory devices in the plurality of memory devices. In one such embodiment, each multi-buffer of the plurality of multi-buffers at block 804 spans all of the external memory devices in the plurality of external memory devices, as illustrated in FIG. 4.

At block 806, each multi-buffer of the plurality of multi-buffers of block 804 is partitioned into a number of buffer chunks. In an embodiment, the number of buffer chunks is determined according to Equation 3. In one embodiment, the number of buffer chunks is equal to the number of memory devices in the plurality of memory devices. The buffer chunks are distributed equally among the plurality of memory devices, according to an embodiment. For example, in an embodiment, the buffer chunks are distributed among the plurality of memory devices as illustrated in FIG. 4. In another embodiment, the buffer chunks are distributed among the plurality of memory device as illustrated in FIG. 5, with first chunks of at least some multi-buffers distributed to different ones of the memory devices provided at block 802.

At block 808, each of one or more packets is stored in consecutive buffer chunks of at least one multi-buffer of the plurality of multi-buffers. The packets are stored at block 808 according to the technique 300 described above with reference to FIG. 3, according to one embodiment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored on non-transitory computer readable medium such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The software or firmware instructions may include machine readable instructions that, when executed by the processor, cause the processor to perform various acts.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for storing packets in a network device, the method comprising:
   partitioning a memory space spanning a plurality of external memory devices into a plurality of multi-buffers, wherein each multi-buffer spans multiple memory devices in the plurality of external memory devices;
   partitioning each multi-buffer into a plurality of buffer chunks, wherein the plurality of buffer chunks are distributed among the multiple memory devices;
   determining a target queue for a packet, the target queue from among a plurality of target queues associated with a plurality of ports of the network device;
   selecting, from the plurality of multi-buffers, the first multi-buffer for storing the packet based on the determined target queue;
   dividing the packet into one or more packet chunks including at least a first packet chunk; and
   storing the one or more packet chunks in one or more consecutive buffer chunks of at least a first multi-buffer of the plurality of multi-buffers.

2. The method of claim 1, wherein the plurality of external memory devices consists of N memory devices, and wherein partitioning each multi-buffer into a plurality of buffer chunks comprises partitioning each multi-buffer into M buffer chunks, wherein N is a positive integer greater than one, and wherein M is an integer multiple of N.

3. The method of claim 1, wherein dividing the packet into one or more packet chunks comprises dividing the packet into a number of packet chunks, the number determined based at least on i) a size of the packet and ii) a size of each buffer chunk of the multi-buffer.

4. The method of claim 1, wherein selecting, from the plurality of multi-buffers, the first multi-buffer includes:
   determining whether a writable multi-buffer for the target queue exists;
   when it is determined that a writable multi-buffer for the target queue exists, selecting the writable multi-buffer as the first multi-buffer for storing the packet; and
   when it is determined that a writable multi-buffer for the target queue does not exist, allocating, from a pool of free multi-buffers, a multi-buffer for the target queue and selecting the allocated multi-buffer as the first multi-buffer for storing the packet.

5. The method of claim 1, wherein storing the one or more packet chunks in the first multi-buffer comprises:
   writing the first packet chunk at a first available buffer chunk of the first multi-buffer;
   determining if the first packet chunk is the last chunk of the packet; and
   when it is determined that the first packet chunk is not the last chunk of the packet, writing one or more subsequent packet chunks in one or more subsequent buffer chunks of the first multi-buffer.

6. The method of claim 1, wherein storing the one or more packet chunks in one or more consecutive buffer chunks of at least the first multi-buffer comprises:
   determining that at least one packet chunk of the one or more packet chunks does not fit in the first multi-buffer; and
   in response to determining that at least one packet chunk of the one or more packet chunks does not fit in the first multi-buffer:
   selecting a second multi-buffer for storing the packet based on the determined target queue; and
   storing, in the second multi-buffer, the at least one packet chunk that does not fit in the first multi-buffer.

7. The method of claim 1, further comprising generating a packet descriptor, wherein the packet descriptor includes at least i) a multi-buffer index identifying the first multi-buffer, ii) a buffer chunk index identifying a buffer chunk used for storing the first packet chunk, and iii) a number of buffer chunks used for storing the plurality of packet chunks.

8. The method of claim 7, further comprising retrieving, using the packet descriptor, the one or more packet chunks from the external memory devices in which the one or more packet chunks are stored.

9. A network device comprising:
   a plurality of ports;
   a packet processor including a forwarding engine coupled to the plurality of ports, the forwarding engine configured to transfer packets received via at least some of the plurality of ports to one or more appropriate ports in the plurality of ports;
   wherein the packet processor is configured to determine target queues for packets, the target queues determined from among a plurality of target queues associated with the plurality of ports;
   a plurality of external memory devices to store packets received via the plurality of ports; and
   wherein the packet processor further includes a memory controller configured to:
   partition a memory space spanning the plurality of external memory devices into a plurality of multi-buffers, wherein each multi-buffer spans multiple memory devices in the plurality of external memory devices,
   partition each multi-buffer into a plurality of buffer chunks, wherein the plurality of buffer chunks are distributed among multiple external memory devices;
   select, from the plurality of multi-buffers, a first multi-buffer for storing a received packet based on a target queue determined by the packet processor for the received packet;
   divide the received packet into one or more packet chunks including at least a first packet chunk, and
   store the one or more packet chunks in one or more consecutive buffer chunks of at least a first multi-buffer of the plurality of multi-buffers, wherein the buffer chunks of the first multi-buffer are distributed among multiple memory devices in the plurality of memory devices.

10. The apparatus of claim 9, wherein the plurality of external memory devices consists of N memory devices, and wherein the memory controller is configured to partition each multi-buffer into M buffer chunks, wherein N is a positive integer greater than one, and wherein M is an integer multiple of N.

11. The apparatus of claim 9, wherein the memory controller is configured to divided the received packet into a number of packet chunks, the number determined based at least on i) a size of the received packet and ii) a size of each buffer chunk of the multi-buffer.

12. The apparatus of claim 9, wherein the memory controller is further configured to select the first multi-buffer at least by:
   determining whether a writable multi-buffer for the target queue exists;
   when it is determined that a writable multi-buffer for the target queue exists, selecting the writable multi-buffer as the first multi-buffer for storing the packet; and
   when it is determined that a writable multi-buffer for the target queue does not exist, allocating, from a pool of free multi-buffers, a multi-buffer for the target queue and selecting the allocated multi-buffer as the first multi-buffer for storing the packet.

13. The apparatus of claim 9, wherein the memory controller is configured to store the one or more packet chunks in the first multi-buffer at least by:
   writing the first packet chunk at a first available buffer chunk of the first multi-buffer;
   determining if the first packet chunk is the last chunk of the packet; and
   when it is determined that the first packet chunk is not the last chunk of the packet, writing one or more subsequent packet chunks in one or more subsequent buffer chunks of the first multi-buffer.

14. The apparatus of claim 9, wherein the memory controller is further configured to:
   determine that at least one packet chunk of the one or more packet chunks does not fit in the first multi-buffer; and
   in response to determining that at least one packet chunk of the one or more packet chunks does not fit in the first multi-buffer:
   select a second multi-buffer for storing the packet based on the determined target queue; and
   store, in the second multi-buffer, the at least one packet chunk that does not fit in the first multi-buffer.

15. The apparatus of claim 9, wherein the memory controller is further configured to generate a packet descriptor, wherein the packet descriptor includes at least i) a multi-buffer index identifying the first multi-buffer, ii) a buffer chunk index identifying a buffer chunk used for storing the first packet chunk, and iii) a number of buffer chunks used for storing the plurality of packet chunks.

16. The apparatus of claim 15, wherein the memory controller is further configured to retrieve, using the packet descriptor, the one or more packet chunks from the external memory devices in which the one or more packet chunks are stored.

17. A method for memory load balancing in a network device, the method comprising:
   providing a plurality of external memory devices communicatively coupled to the network device;
   partitioning a memory space spanning the plurality of external memory devices into a plurality of multi-buffers, wherein each multi-buffer spans the plurality external memory devices;
   partitioning each multi-buffer of the plurality of multi-buffers into a number of buffer chunks, the number of buffer chunks determined based on a number of memory devices in the plurality of external memory devices, wherein the buffer chunks of each multi-buffer are distributed equally among the plurality of memory devices; and
   determining respective one or more target queues for one or more packets received at the network device, the one or more target queues from among a plurality of target queues associated with a plurality of ports of the network device;
   selecting, from the plurality of multi-buffers, respective multi-buffers for storing the one or more packets based on the determined target queues;
   storing each of the one or more packets received at the network devices in consecutive buffer chunks of at least one selected multi-buffer of the plurality of multi-buffers, wherein the buffer chunks of the at least one multi-buffer are distributed equally among the plurality of memory devices.

18. The method of claim 17, wherein the plurality of external memory devices consists of N memory devices, and wherein partitioning each multi-buffer into the number of buffer chunks comprises partitioning each multi-buffer into M buffer chunks, wherein N is a positive integer greater than 1, and wherein M is an integer multiple of N.

19. The method of claim 17, wherein:
   determining respective one or more target queues for the one or more packets comprises determining that a first packet belongs to a first target queue;
   selecting, from the plurality of multi-buffers, respective multi-buffers for storing the one or more packets comprises selecting, from the plurality of multi-buffers, a first multi-buffer for storing the first packet, wherein the first multi-buffer is selected according to the first target queue; and
   storing each of one or more packets comprises
      dividing the first packet into one or more packet chunks, and
      storing the first packet in one or more consecutive buffer chunks of the first multi-buffer.

20. The method of claim 19, wherein:
   determining respective one or more target queues for the one or more packets comprises determining that a second packet belongs to the first target queue;
   selecting, from the plurality of multi-buffers, respective multi-buffers for storing the one or more packets comprises selecting the first multi-buffer for storing the second packet; and
   storing each of one or more packets comprises
      dividing the second packet into one or more packet chunks including at least a first packet chunk, and
      storing the one or more packet chunks of the second packet in consecutive buffer chunks of the first multi-buffer including storing the first packet chunk in a buffer chunk that immediately follows the last buffer chunk used for storing the first packet.

21. The method of claim 20, wherein
   determining respective one or more target queues for the one or more packets comprises determining that a third packet belongs to a second target queue, the second target queue different than the first target queue;
   selecting, from the plurality of multi-buffers, respective multi-buffers for storing the one or more packets comprises selecting, from the plurality of multi-buffers, a second multi-buffer for storing the third packet, wherein the second multi-buffer is selected according to the second target queue, and wherein the second multi-buffer is different than the first multi-buffer; and
   storing each of one or more packets comprises
      dividing the third packet into one or more packet chunks including at least a first packet chunk, and
      storing the one or more packet chunks of the third packet in consecutive buffer chunks of the second multi-buffer including storing the first packet chunk of the third packet in a first available buffer chunk of the second multi-buffer.

22. The method of claim 17, wherein:
a first buffer chunk of a first multi-buffer allocated for a first target queue corresponds to a memory chunk in a first memory device of the plurality of memory devices, and
each subsequent buffer chunk of the first multi-buffer corresponds to a respective memory chunk in a respective subsequent memory device of the plurality of memory devices;
and wherein:
a first buffer chunk of a second multi-buffer belonging to a second target queue, the second target queue different than the first target queue, corresponds to a memory chunk in a second memory device, the second memory device different than the first memory device, and
each subsequent buffer chunk of the second multi-buffer corresponds to a respective memory chunk in a respective subsequent memory device of the plurality of memory devices.

23. A network device comprising:
a plurality of ports;
a packet processor including a forwarding engine coupled to the plurality of ports, the forwarding engine configured to transfer packets received via at least some of the plurality of ports to one or more appropriate ports in the plurality of ports;
wherein the packet processor is configured to determine target queues for packets, the target queues determined from among a plurality of target queues associated with the plurality of ports;
a plurality of external memory devices to store packets received via the plurality of ports;
wherein the packet processor further includes a memory controller configured to
partition a memory space spanning the plurality of external memory devices into a plurality of multi-buffers, wherein each multi-buffer spans the plurality external memory devices, and
partition each multi-buffer of the plurality of multi-buffers into a number of buffer chunks, the number determined based on a number of memory devices in the plurality of external memory devices, wherein the buffer chunks of each multi-buffer are distributed equally among the plurality of memory devices; and
select, from the plurality of multi-buffers, respective multi-buffers for storing one or more packets based on determined target queues;
store each of one or more packets in consecutive buffer chunks of at least one selected multi-buffer of the plurality of multi-buffers.

24. The network device of claim 23, wherein the plurality of external memory devices consists of N memory devices, and wherein the memory controller is configured to partition each multi-buffer into M buffer chunks, wherein N is a positive integer greater than 1, and wherein M is an integer multiple of N.

25. The network device of claim 24, wherein the memory controller is further configured to:
determine that a first packet belongs to a first target queue;
divide the first packet into one or more of packet chunks; and
select, from the plurality of multi-buffers, a first multi-buffer for storing the first packet, wherein the first multi-buffer is selected according to the first target queue; and
store the first packet in one or more consecutive packet chunks of at least the first multi-buffer.

26. The network device of claim 25, wherein the memory controller is further configured to:
determine that a second packet belongs to the first target queue;
divide the second packet into one or more packet chunks including at least a first packet chunk;
select the first multi-buffer for storing the second packet; and
store the one or more of packet chunks of the second packet in consecutive buffer chunks of the first multi-buffer including storing the first packet chunk in a buffer chunk that immediately follows the last buffer chunk used for storing the first packet.

27. The network device of claim 26, wherein the memory controller is further configured to:
determine that a third packet belongs to a second target queue, the second target queue different than the first target queue;
divide the third packet into one or more packet chunks;
select, from the plurality of multi-buffers, a second multi-buffer for storing the first packet, wherein the second multi-buffer is selected according to the second target queue, and wherein the second multi-buffer is different than the first multi-buffer; and
store the one or more packet chunks of the third packet in consecutive buffer chunks of the second multi-buffer.

28. The network device of claim 23, wherein:
the first buffer chunk of a first multi-buffer allocated for a first target queue corresponds to a memory chunk in a first memory device of the plurality of memory devices, and
each subsequent buffer chunk of the first multi-buffer corresponds to a respective memory chunk in a respective subsequent memory device of the plurality of memory devices;
and wherein:
the first buffer chunk of a second multi-buffer belonging to a second target queue, the second target queue different than the first target queue, corresponds to a memory chunk in a second memory device, the second memory device different than the first memory device, and
each subsequent buffer chunk of the second multi-buffer corresponds to a respective memory chunk in a respective subsequent memory device of the plurality of memory devices.

* * * * *